Aug. 15, 1933.  R. J. SOUTHWELL ET AL  1,922,271
APPARATUS FOR FORMATION AND WELDING OF CROSSED WIRE PRODUCTS
Filed Jan. 3, 1933  11 Sheets-Sheet 8

INVENTORS
Raymond J. Southwell.
Theodore H. Wickwire, Jr.
BY
Dyke & Schanies
ATTORNEYS.

Patented Aug. 15, 1933

1,922,271

UNITED STATES PATENT OFFICE 1,922,271

APPARATUS FOR FORMATION AND WELD-
ING OF CROSSED WIRE PRODUCTS

Raymond J. Southwell and Theodore H. Wick-
wire, Jr., New York, N. Y., assignors to
Welded Fabrics Corporation, New York, N. Y.,
a Corporation of New York Application January 3, 1933. Serial No. 649,794

21 Claims. (Cl. 219—4)

This invention relates to apparatus for the formation and welding of crossed wire products. The invention is described herein with special reference to the manufacture of electrically welded wire mesh fabric, but its advantages can be realized in the manufacture of other products made of crossed wires and welded together at crossings. The present case is in part a continuation of our prior application Serial No. 495,598, filed on November 14, 1930, and also contains subject matter in addition thereto.

The mechanism shown herein to illustrate the invention is adapted to form a sheet of fabric continuously by laying or folding a set of continuous parallel wires recurrently inwardly from edge to edge of the sheet width, with each fold or layer over a part, preferably one-half part, of the area of the preceding fold or layer, so that the leading strand of the set is always at one face of the fabric, and the rearmost strand of the set is always cn the other face, with the intermediate strands in each layer or fold disposed partly at one face and partly at the other in graduated relation therebetween. Such a fabric can be made by the apparatus of our invention continuously and very rapidly, with complete avoidance of preliminary preparatory operations such as winding warp on a warp roller, tying on new warps and the like that are required when, instead of being merely formed of crossed wires, the wire fabric is produced by the slow process of weaving.

An object of the invention consists in the provision of apparatus for making welded fabric of crossed wires rapidly and continuously.

Another object consists in the making of provision for the automatic welding of a fabric formed of crossed wires arranged in the manner just described by a welding circuit completed by the extra thickness of the crossed wires passing between welding electrodes so constructed and arranged that the resistance under load at the various multiple welding points is practically identical, thereby securing uniform, rapid and efficient welding. The welding is claimed herein only as a part of the apparatus for making welded fabric of crossed wires, the welding process being claimed in a companion application of ours, Serial No. 649,793, filed on even date herewith.

Another object of the invention consists in the provision of means for forming and feeding the crossed wire mesh which can be operated at practically any speed that may be selected, in combination with means for regulating the speed made use of for the sole purpose of controlling the time interval for welding.

Additional objects include making provision for forming the crossed wires and holding the same in formation while moving along on conveyors or travelers; making provision for electrical welding of the crossed wires when traveling at the high speed of formation and without derangement of the strands; provision of means for imparting a predetermined spacing at the point where the welding operation is performed; the provision of means for forming a selvage at fabric edges; the supporting of the spools or reels for strand supply on stationary supports from which they are unwound without the spools being subjected to any bodily or translatory movement; the provision of means for supplying of wires to the mesh forming apparatus with minimum bending which is of special importance with heavy wires as in making reinforcing mesh for concrete, and other objects are in part pointed out below, and in part obvious from the following description.

In the drawings:

Fig. 4 is a plan view being an enlargement of the extreme left portion of Figure 1.

Figs. 20 and 21 are diagrams in plan view illustrating the fabric formation. In Figure 20, the strands are shown in position to be engaged by the hooks, and in Figure 21, each strand is in engagement with two of the traveler hooks, the hooks moving in the direction of the arrow on said figure.

Fig. 21$^a$ is a section on line 21—21, Figure 1, and showing the welding rollers.

Fig. 26 is a fragmentary side view and Fig. 27 a plan view, of the discharge end of the machine.

The elongated machine frame 10 is made strong and rigid, and is strongly supported throughout its length as by means of standards 12.

Frame 10 carries a pair of parallel longitudinally disposed travelers 14—14', preferably endless and driven from the cross shaft 16 at the delivery end of the machine and running over an idler shaft 16' at the other or feed-in end of the machine.

Figures 5, 25:
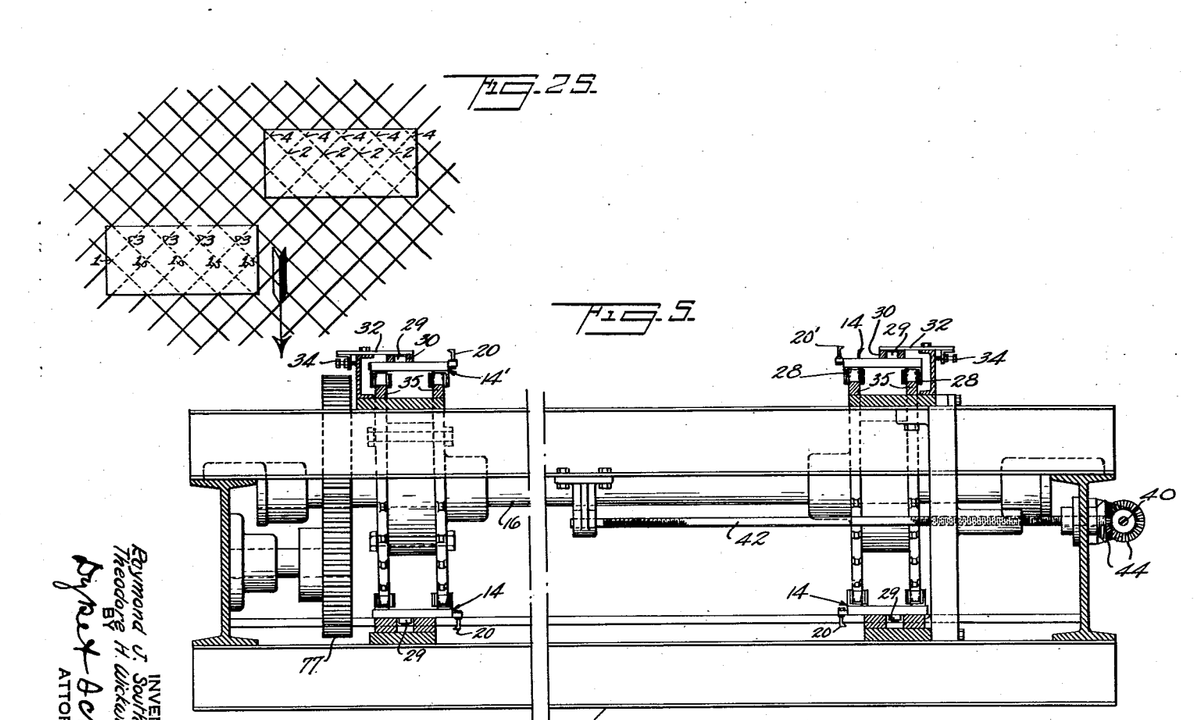
Fig. 5 is a section on the line 5—5 of Figure 1.
Fig. 25 is a diagrammatical plan view to indicate the preferred welding cycle.

The wires 18 are engaged, and the fabric formed thereon carried forward, by hooks 20 of the traveler 14, 14'. (Fig. 5).

Figures 8, 9:
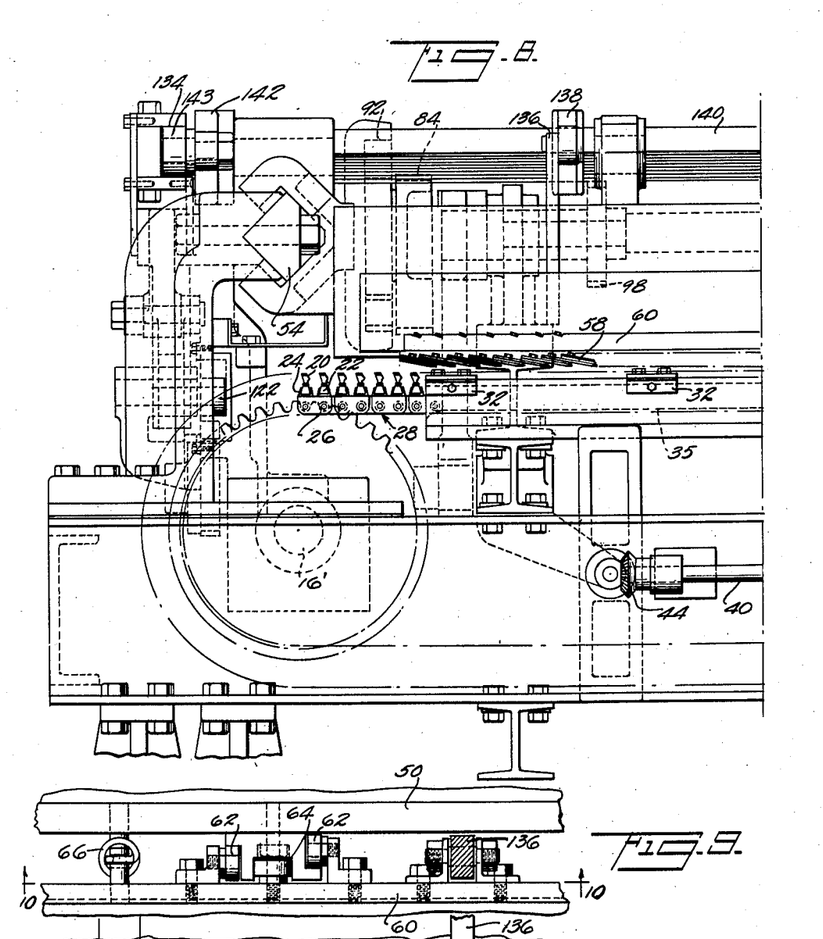
Fig. 8 is a front elevation being an enlargement of the left upper portion of Figure 2.
Fig. 9 is an enlargement of the right center portion of Figure 4 marked "A" on said Figure 4.
Figure 10:
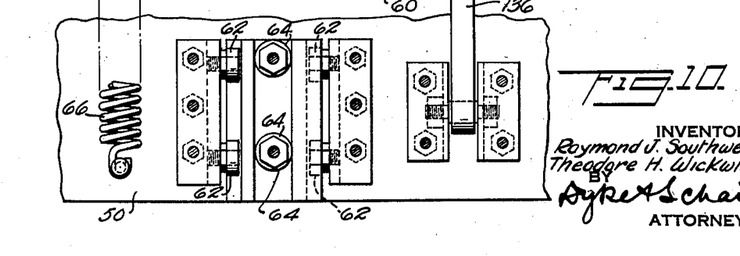
Fig. 10 is a section on line 10—10, Figure 9.
Figure 11:
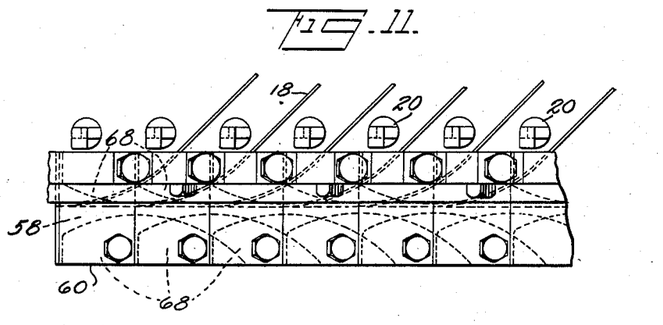
Fig. 11 is a fragmentary plan view of the cross carriage for crosswise feeding of the wire strands, and shows in plan the relation of the cross carriage to the traveler hooks when the former is at the extreme end of its outward movement.
Figures 12, 13, 14, 15:
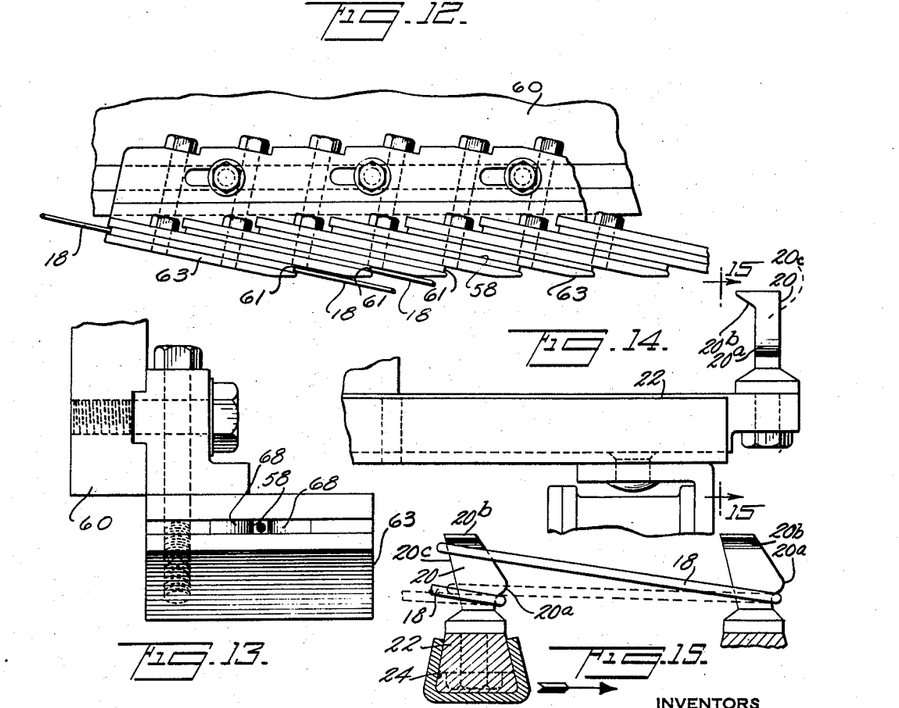
Fig. 12 is a front elevation of the cross carriage for feeding the strands that is shown in plan in Figure 11.
Fig. 13 is an enlarged end elevation looking at the left end of Figure 12.
Fig. 14 is an enlarged detail of the hook mountings on the traveler chain links.
Fig. 15 is a section on line 15—15, Figure 14.

In the construction shown, hooks 20 are mounted on slides 22 that are slidable transversely to the direction of movement of travelers 14, 14' in the elongated slideways (Fig. 15), formed in or carried by the sprocket links 26 of the preferably double sprocket chains 28—28 of each of the travelers, preferably two such slideways 24, (and slides 22) being provided for each link. (Figs. 5 and 8.) The sliding movement of hook-slides 22 in slideways 24 (and consequently the lateral distance between the two sets of hooks 20) is regulated by upwardly extending rollers 29 (Fig. 5) of slides 22 following the tracks or groove between the rails 30, 30 carried by the brackets 32, which serve to take the lateral pull or thrust exerted on the hooks by the wires, relieving the sprocket-chains or other travelers from sidewise pull. Said members 32 are adjustable by means of the adjusting screws 34. As an example of such adjustment, at the discharge end of the machine, rails 30 are so adjusted and flexed as to bring the hooks 20 on each side closer together than normal, (Figs. 26 and 27) to permit the fabric to be released from the traveler hooks 20 and wound on a take-up roll or equivalent (not shown). Similarly, parts of rails 30 can be laterally adjusted to relieve or impose tension on the wire formation, or to accommodate growth in width of the fabric which may result from formation of multiple welds thereacross, etc. etc. The formation of the wires that have been engaged with the hooks on the travelers is kept flat and plane on the upper reaches of sprocket chains 28 by the link-rollers thereof running on tracks 35. The welded fabric is discharged from the hooks 20 in the region of drive shaft 16. In the lower reach the travelers run back freely without engagement of their hooks 20 with the fabric strands 18.

To make fabric of different widths, one of the travelers, as 14, with its associated guide member 32 may be adjustable bodily toward and away from the second traveler 14', which is stationary. Such adjustment is preferably made simultaneously throughout the length of the movable traveler, as by means of a master shaft 40 which may be rotated as by a crank or the like, and screws 42 driven from shaft 40 as by means of bevel gears 44.

The cross carriage 50 extends longitudinally of the machine at the entrance or feed-in end and takes strands 18 from stationary spools or reels 52 and feeds a set thereof across back and forth transversely with respect to the traveler movement, and engages same with the hooks 20 of the travelers 14—14'.

That the strand material is carried on and unwound from stationary reels or spools 52, is an important feature inasmuch as in this way the cross carriage carries very little weight of strand material, and the feed can be stopped very readily and quickly, and tangling avoided when it is desired to mend a broken strand or give other service attention.

The arrangement of the spools or reels 52 with respect to the travelers is such that the strands 18 come off the stationary reels or spools in the direction of travel of the machine travelers 14, 14', thereby reducing to a minimum the bending of the strands, as they are fed into the machine, which would be detrimental particularly in the case of making fabric of heavy wire, and also equalizing such small bending, as takes place in feeding, to each side of the central axis of the travelers.

The lower spools or reels 52 of wire are preferably arranged to supply their strands 18 at that end of the cross carriage 50 nearest them, with the spools or reels higher up supplying their strands successively toward the forward end of the carriage, so that interference and tangling of wires is avoided.

Figure 1:
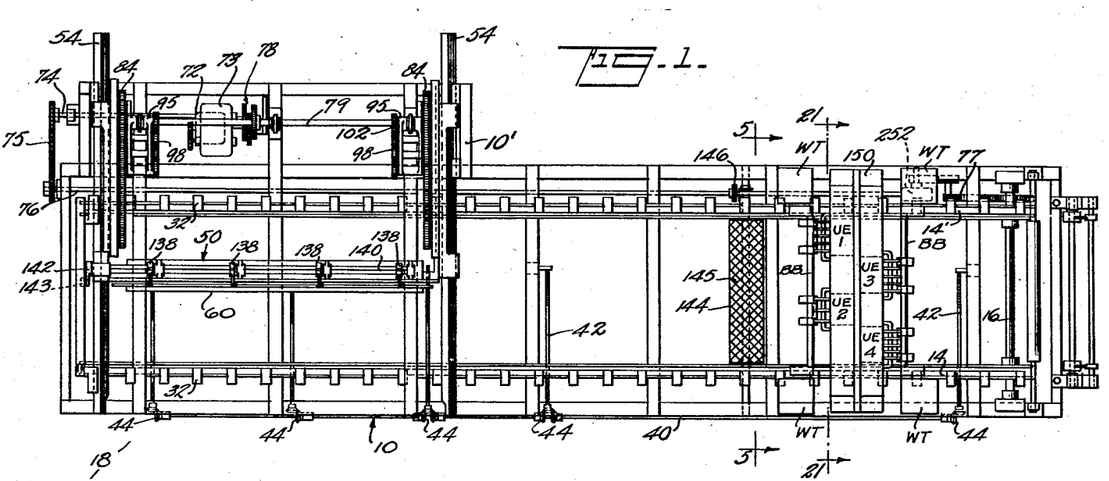
Figure 1 is a plan view of a machine embodying our invention.
Figure 2:
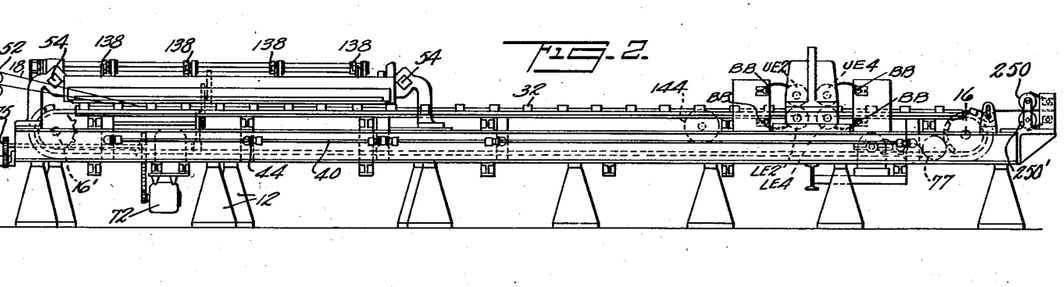
Fig. 2 is a front elevation.

The cross carriage 50 runs on the tracks 54, 54 extending transversely across the feeding-in end of the machine, and the drive mechanism therefor is located in the lateral extension 10' (Fig. 1) of the machine frame projecting beyond the traveler 14'. While the hooks, as 20, could be arranged to move up and down and act as picks to engage strands having horizontal movement only, with the arrangement shown the hooks 20 are fixed on their slides 22, and strands 18 are given a down-and-up movement to engage therewith. The movement of the cross carriage 50 is such that there is a dwell at each extreme of its travel. During such dwell, after the strands 18 have been carried laterally beyond the traveler hooks 20, they are moved downwardly and each strand is engaged with preferably two of the hooks 20, before being raised above the succeeding hooks and carried backwardly toward the other traveler. Engagement of each strand of wire with two hooks in this manner provides a mesh formation having a substantially continuous selvage on the fabric as indicated at 55, Figure 19. The initial lowering of the strand is sufficient to cause it to be caught under the nose 20$a$ on the advancing front of the forward one of the pair or couplet of hooks 20, that it engages. By the time the strand has passed outside of the second of the hooks to be engaged, it will have been raised somewhat, but not sufficiently to get up over the claw 20$b$ on the outside of that hook. It is thus caught and held under such claw 20$b$. When the carriage has moved backwardly away from the hooks, the wire strand being held down by the nose 20a on the front of the forward hook, rides down on the incline 20c on the back of the rearmost hook and is held and carried along with the traveler during its succeeding period of movement and until released in substantially the position relative to the hooks 20, that is indicated in dotted lines in Figure 15.

The up-and-down movement of the strands at the respective ends of the transverse movement of carriage 50 is obtained by feeding the strands through slots 58 provided therefor in a wire feeding frame 60, which is mounted on the carriage 50 in such manner as to permit a short up-and-down movement. (Figs. 8–13). Said wire feeding frame 60 is guided by guide rolls 62, 64 (Fig. 9) so as to move freely and yet be held firmly against shaking or chatter, and the same effect is obtained, and its return after downward movement aided or accelerated, by provision of springs 66 with the upper and lower ends thereof attached to the carriage 50 and wire feeding frame 60 respectively.

The strands 18 pass through the slots 58 and out at 61, 61, from the under side of the wire feeding frame 60 to engage the hooks 20 on the travelers, the feed slots 58 for feeding the strands 18 being inclined (Fig. 12) to suit the angle at which the strands are delivered from the supply spools or reels, and the slots 58 being formed between the half-round blocks 68, so that the strands 18 pass freely into and through and out of such feed slots 58, and any bending of the wires or other strands at this point is on a comparatively long radius and sharp bending is avoided. A bolted-together construction of the wire supplying nozzles 63 is preferably made use of so that the spacing of the wire delivery exits at 61 may be adjusted to compensate for elongation of the traveler and consequent slight increase of hook spacing after long use.

The arrangement for reciprocating the cross carriage 50 is adapted to produce a sweeping or through movement thereof, followed by a period of slowing down, followed in turn by a dwell at each end of its movement, during which dwell period the strands are raised and lowered as just described, then the carriage is speeded up as return movement begins, after which there is a smooth sweeping return movement to the first traveler, etc.

Carriage 50 and travelers 14, 14', are driven from a source of power, as for example the motor 72. The drive is through a speed reduction gear 73, preferably of the so-called infinitely variable type. The drive therefrom to the travelers is through shaft 74, sprocket 75 and shaft 76 and gear train 77 to the traveler drive shaft 16, while that to cross-carriage 50 is through gear train 78 to the cross carriage drive shaft 79. There is thus complete coordination of movement between the hook carrying travelers and the cross carriage.

Figures 6, 7:
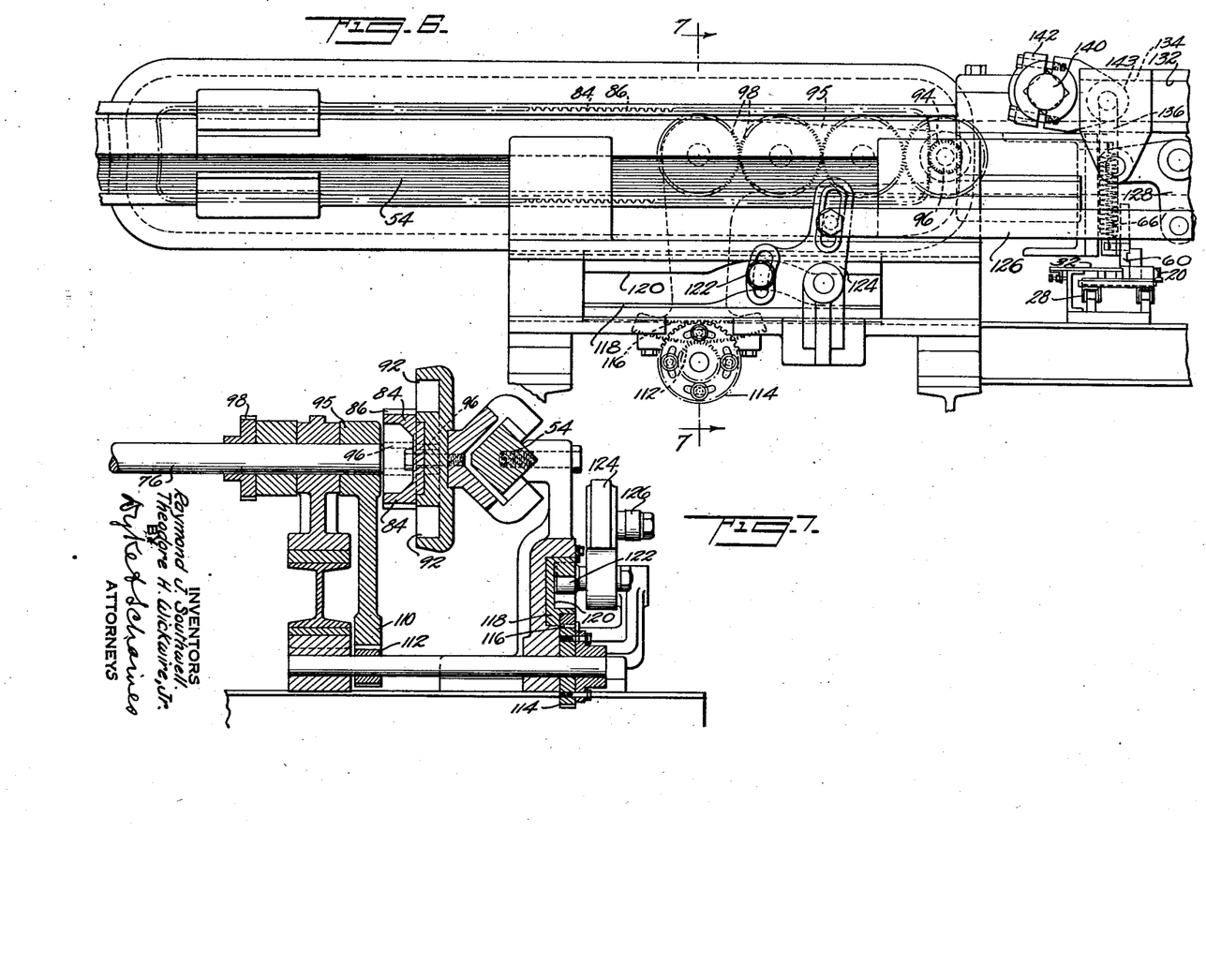
Fig. 6 is a further enlargement of the left part of Figure 3 and showing the strand feeding frame in lowered position to engage the strands with the traveler hooks.
Fig. 7 is a section on line 7—7, Figure 6.

The preferred means for driving the cross carriage and holding it stationary for an interval at each end of its movement comprises a pair of toothed racks 84 (Fig. 6) of substantially rectangular formation having the teeth 86 thereof extending all the way around the four sides. Each rack 84 is formed or mounted on a drive block 88 (Fig. 4) for driving cross carriage 50 to which the drive blocks 88 are bolted at 90.

Figure 3:
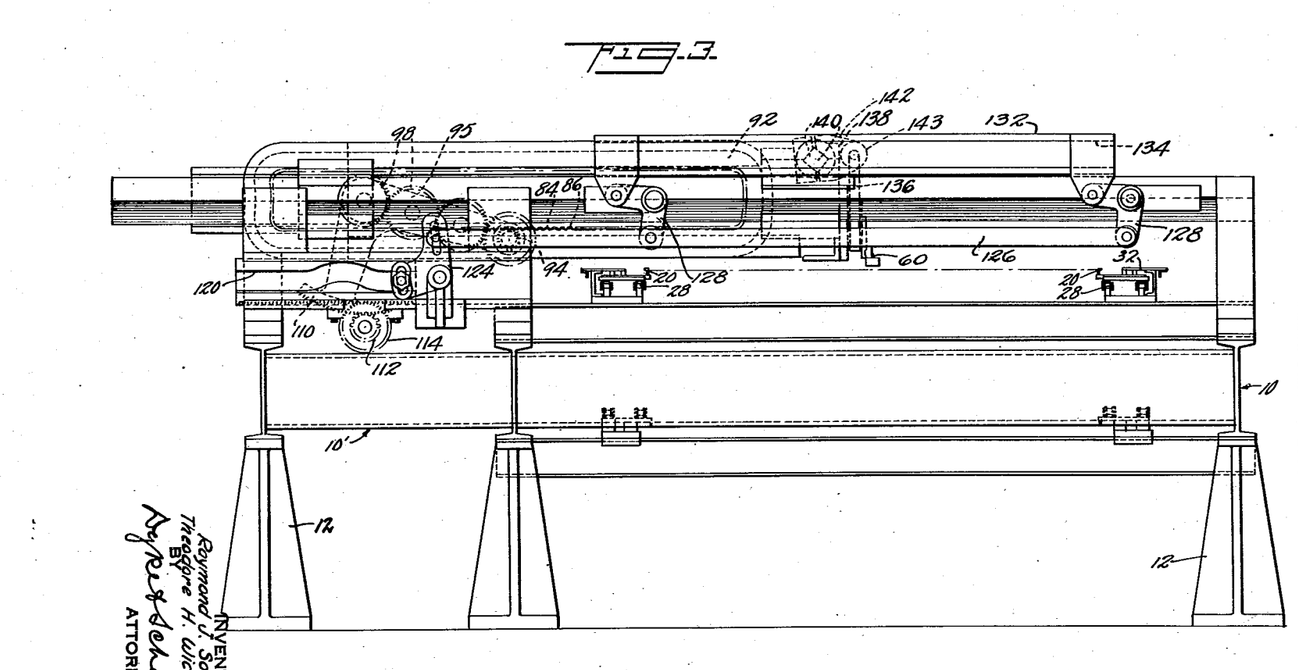
Fig. 3 is an elevation on enlarged scale looking at the left end of Figure 1.
Figures 4, 26, 27:
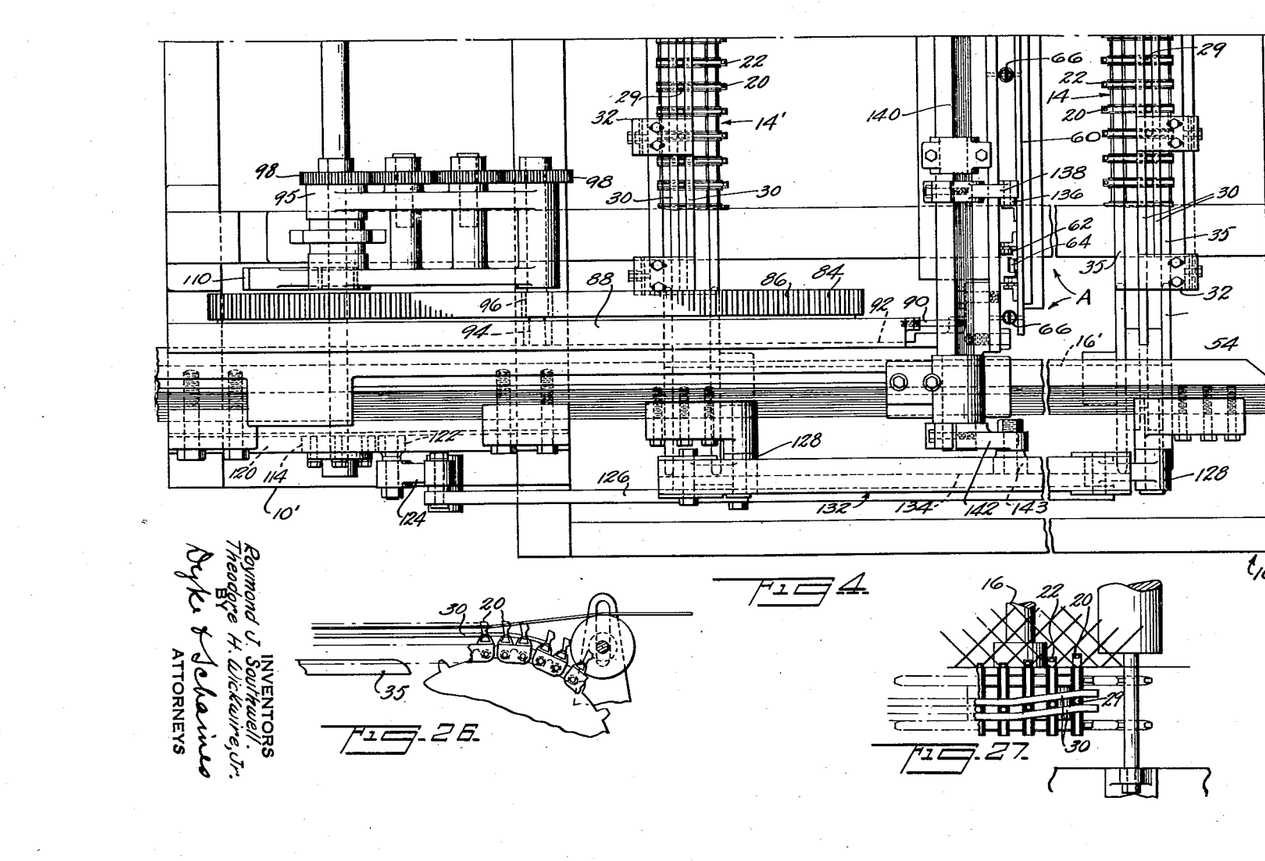

Drive block 88 has a guide groove 92 (Fig. 3) surrounding the rack 84, said guide groove 92 being adapted to be entered and traversed by guide roller 94 on the end of the shaft for drive pinion 96. (Fig. 4.)

The geared toothed periphery of the rack member 84 (and guide groove 92) is substantially convex at one end and concave at the other end, thus making radial end portions adapted to enable the rack member 84 to remain stationary during up and down swinging movements of the swing arm 95 through which same is actuated and which is now to be described.

The drive pinion 96 on said arm 95 drives the rack 84 by engaging the teeth 86 thereof and is itself actuated through a chain of gears 98 mounted therewith on the swing arm 95 and driven from the master gear 102 on shaft 79, said swing arm 95 being pivoted to turn on the same axis as shaft 79.

With this arrangement, and the movement of swing arm 95 controlled by the travel of roller 94 in trackway 92, a cross feeding movement is imparted to the cross carriage 50 during engagement of the pinion 96 with the lower teeth of the rack 84, and cross carriage 50 is driven in the opposite direction during engagement of the pinion 96 with the teeth of the upper part of the rack, and the cross carriage 50 remains stationary between such periods of feeding movement while the drive pinion 96 is engaged with the radially disposed toothed portions on the respective ends of the rack.

The gearing and/or drive blocks and racks can be replaced to vary the resulting movement as desired, as when resetting to change the fabric width.

The swinging movement of swing-arm 95 produced by engagement of the drive pinion thereof with the toothed end portions of rack member 84, and of the roller 94 in guide groove 92 is utilized to actuate the wire feeding frame 60 in its up-and-down movement on reciprocating carriage 50. With the arrangement shown, said arm 95 carries a sector 110 meshing with a pinion 112, which serves to produce forward and backward rotation of a gear 114, fixed, preferably adjustably (Fig. 6) to pinion 112 to rotate therewith.

Gear 114 meshes with the gear teeth 116 of the cam rack slide member 118, which contains a cam guideway 120 adapted to receive the roller 122 of an elbow lever 124, to actuate the upper arm thereof back-and-forth in response to each uni-directional movement of slide member 118 and thereby impart back-and-forth longitudinal movement to a link 126. Link 126 actuates a further pair of elbow levers 128, 128 to thereby impart bodily up-and-down movement to the guide rail member 132 containing a guide groove 134.

Figures 16, 17, 19:
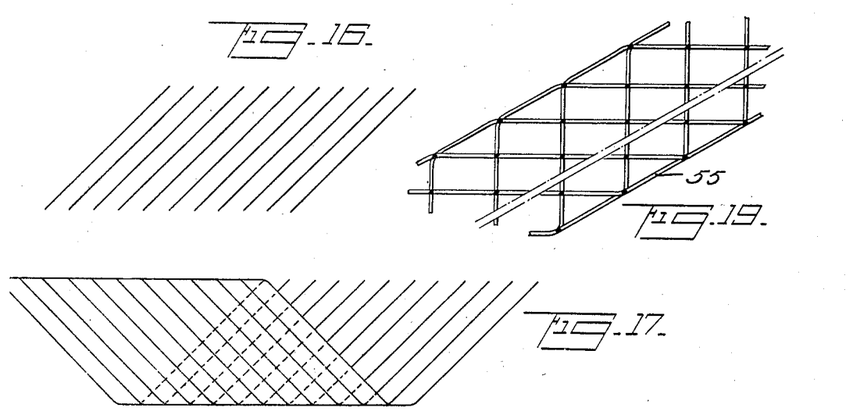
Figs. 16, 17 and 18 are diagrammatic plan views of strand formation.
Fig. 19 is a perspective of completed wire mesh with selvage as formed when the wire strands are hooked under two successive hooks of the traveler.
Figure 18:
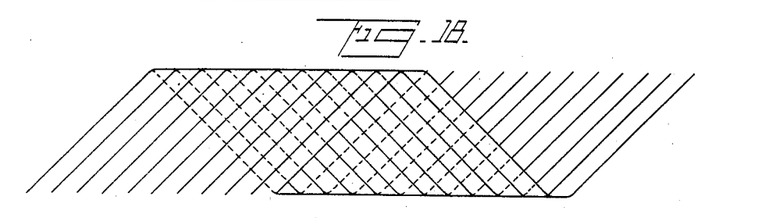

The strand feeding frame 60 of cross carriage 50 is connected by links 136 to the throw arms 138 of a shaft 140 mounted on the cross carriage 50. Said shaft 140 has an actuating crank 142 attached thereto and a roller 143 running in the guide groove 134 in the guide rail member 132 as carriage 50 is reciprocated. With this arrangement, the strand feeding frame 60 on cross carriage 50 is moved down and then back up again during the periods of dwell when the cross carriage 50 is stationary at its extreme position on either side of the machine, being assisted in its upward movement by springs 66. As already stated, when the period of strand depression is arranged to permit two hooks 20 to be engaged during such period, the resulting formation includes a selvage portion 55 as shown in Fig. 19.

When forming square diamond mesh with equal diagonals, the set of wires that are being laid down is (disregarding the selvage loops obtained by hooking the wire over two hooks each time) twice as wide as the distance between traveler hooks, but this relation can be varied to produce mesh having its diamonds of unequal diagonals.

It will be seen that the described apparatus for forming, and holding formed, and feeding forward the mesh of crossed wires can be used effectively for performing these functions at practically any predetermined operating speed within a wide range and that this speed need not be reduced for making finer mesh, as is the case in weaving operations, but can be speeded up as desired with practically any size mesh. It thus becomes possible to run at a speed selected solely in order to regulate the time interval in which the welding is done by the welding means, now to be described.

The welding station is preferably located fairly close to the discharge end of the apparatus, and in order to obtain a truly accurate spacing adjustment of the mesh strands, the mesh fabric on the traveling carriers is preferably engaged, just prior to delivery to the welding station, by the helical V-shaped grooves 145 of the roller 144, which is driven at the traveler speed by means of gearing 146.

The welding is performed by roller electrodes mounted in a cross-frame part 150 near such end of the machine. The welding electrodes are arranged in pairs with the individual rollers of each pair located respectively above and below the traveling mesh of crossed wires.

In the form shown, there are four such pairs of welding electrode rollers arranged in two sets of two pairs each, enabling the welding to be accomplished at all the crossings in the width of the formed mesh, and at the same time giving room for the bearings, brushes and other accessories of the electrodes; making it possible by using rollers of various lengths to adapt the machine to various fabric widths being manufactured, and permitting the peak current load to be kept relatively low in a manner hereinafter described.

The lower roller electrodes of the pairs first encountered by the traveling mesh are designated by reference character LE—1, LE—2, and the upper rollers of such pairs UE—1, UE—2, while the rollers of the second set located nearest the discharge end of the machine are designated respectively LE—3, LE—4 and UE—3 and UE—4. We have found that to get uniform and satisfactory welding it is necessary not only that the objects to be welded, as wires at their crossings for example, should be all practically identical or at least present practically identical conditions for current passage as is the case with crossed wires of uniform diameter and section and all of the same material, but that further the electrodes and their connections should be such that when under load, there is substantially uniform resistance at each welding point. This condition is most satisfactorily met by making the resistance encountered in passage of the current to the several welding points as low as practicable. This can be accomplished by use of large diameter roller electrodes of good conducting metallic material, such as copper.

In practice, smooth cylindrical rollers of solid copper about 10″ in diameter, and about 10″ to 20″ long have given very satisfactory results. Within limits referred to below, some roller pairs may be longer than others if desired to permit more ready adaptation to manufacture of welded fabric of various widths. In the illustrated form, one pair of short roller electrodes LE—2, UE—2 is shown and three longer pairs.

The lower electrodes LE are supported by the two cross-beams 152, 152. Beams 152 are adjustable up and down to position the rollers directly under the traveling mesh of crossed wires 18 by means of turnbuckles 154, locked by locknuts 156. When beams 152 are correctly adjusted, as for the thickness of wire being used, they are bolted together and held firmly in place against pads 158 of the frame member 150, by means of the long through bolts 160.

To enable the ready removal and replacement of the lower roller electrodes, each thereof is mounted in a frame-like structure 162 adapted to be engaged with dove-tailed lugs 164 formed on the beams 152 and clamped in place by the double dove-tailed clamps 166 and clamping bolts 168. The roller shafts are insulated and held in place in the rollers by conical bushings, 169 having a permanent force fit. The shafts 170 of the lower roller electrodes have their bearings 172 in or secured to the frames 162, and are driven through pinions 174 secured thereto. When frames 162 and electrodes carried thereby are in place, the electrode shaft pinions 174 mesh with gears 176 upon shafts 178 which run in bearings in the beam members 152, and same are driven through the idler gears 180 from the pinions 182 on shaft 184 driven from shaft 76 and mounted in journals carried in the cross frame member 150, which is midway between the two beams 152. A considerable up-and-down adjustment of the beams 152 (and lower roller electrodes) is possible without interfering with the proper meshing of the gears because the making of such adjustment involves a movement of the idler gears 180 that is practically tangential to the drive pinion 182.

The upper roller electrodes UE that are paired with said lower electrodes LE are also positively driven, and in addition to the carrying beams by which such upper roller electrodes are carried being adjustable so as to produce adjustment of all of the upper rollers together, and hold same suspended at at least some predetermined distance above the lower roller electrodes, the upper rollers are also individually adjustable to finally adjust the minimum height of gap opening between same and the lower roller of the respective pairs, and further the mounting of the upper rollers is such that the gap opening can be increased by each of the upper rollers yielding upwardly to some extent upon application of force from beneath. The carrying beam 190 for the upper roller is adjusted, like lower beam 152, by turnbuckles 192 with lock-nuts 194, and then securely bolted against pads 196 of the frame 150 by the through bolts 198. Individual frame members 200 are provided to carry the upper rollers and their brushes, etc. and a dove-tail clamping arrangement indicated at 202 and 204, similar to that used with the frames for the lower roller electrodes, is provided for detachably clamping frames 200 to beam 190 so as to depend downwardly therefrom.

Journals 206 for the upper roller electrodes UE are mounted in levers 208 pivoted at 210 to frames 200 and having their ends furthest from pivots 210 held upwardly in the frames 200 by the yokes 212, threaded stems 214 and adjusting nuts 216, said nuts being preferably split, and clamped together, after they have been adjusted, by wing bolts 217 to avoid loosening. Separate adjustment of nuts 216 for each end of the upper roller of a pair finally regulates the width of the welding gap between the roller electrodes of the pair. About 80% of the combined thickness of two of the wires 18 is a desirable minimum width for the welding gap, the wire strands being quickly heated as the current passes so as to permit some compression thereof during the welding step. However the upper electrodes may yield to upward pressure, and in the arrangement shown upward yielding of the upper electrode of each pair is opposed by compression springs 218, together with the weight of the roller and supporting levers. Gravity alone may be relied on for normally but yieldably holding the upper rollers down to minimum gap opening, or with unusually heavy rollers, the spring 218 could even operate to oppose instead of aiding gravity as here in illustrated.

Figures 20, 21:
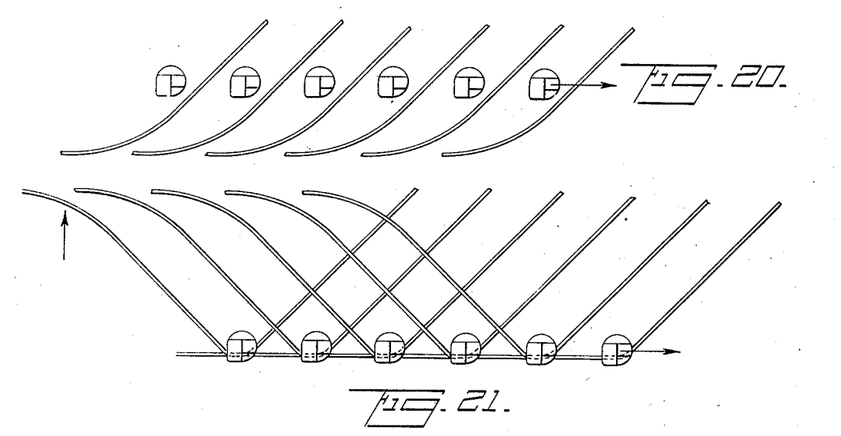
Figure 21:
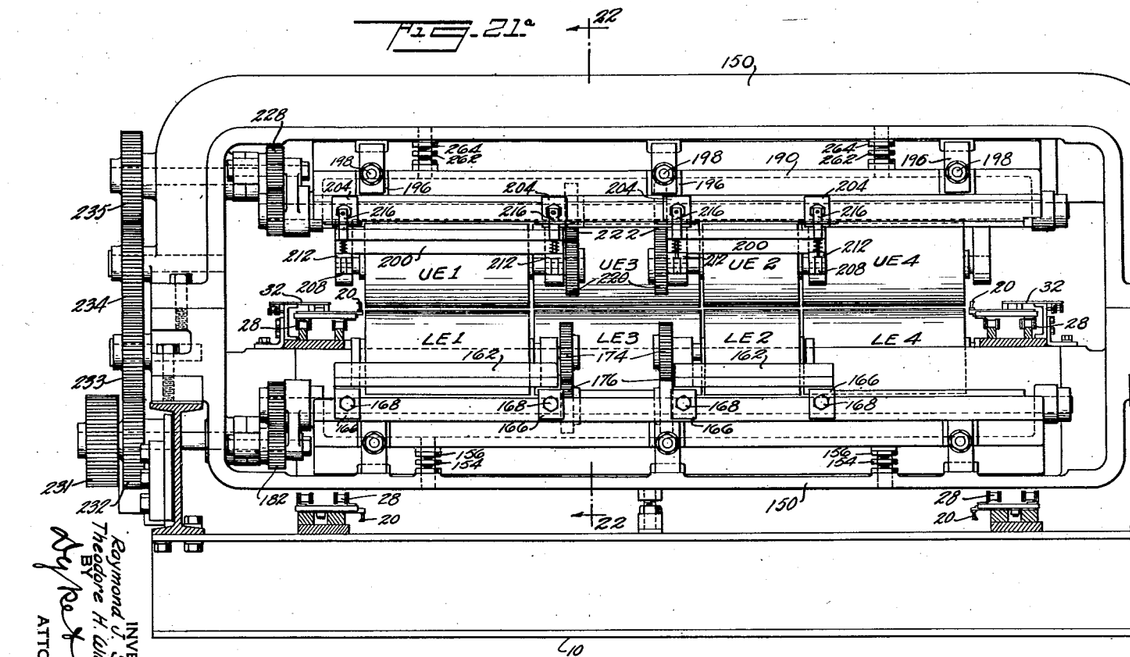

The upper roller electrodes have drive gears 220 on their shafts, and these are driven from pinions 222 on cross shafts 224 journaled in beams 190, and actuated by idler pinions 226, which mesh with pinions 228 on the shaft 230 having its journals in the fixed cross frame member 150. The shaft 230 for imparting drive to the upper roller electrodes and the shaft 184 for imparting drive to the lower roller electrode are driven to operate in unison through driving gear 231 and the train of gears 232, 233, 234 and 235 (Fig. 21). The gear tooth length and clearance in the case of gears 220 and 222 are designed to permit the described adjustment and movement of the upper rollers without materially interfering with the roller drive.

The frame-like supporting members 152 and 200 which carry the electrodes are preferably made to support the brushes for supplying current to the roller electrodes. In the form shown, a shaft 236 is provided in said frames for this purpose and two sets of brushes are pivoted thereon, upper brushes 238 being mounted on the levers 240 journaled on such shaft 236 and urged toward the rollers by means of springs 242, and similarly a lower set of brushes 238' supported on levers 244 and actuated to engage the rollers by means of springs 246. The brushes 238, 238' are preferably pivoted to their lever arms 240, 244 in order to better accommodate themselves to a firm full-contact fit against the roller electrode thus assuring good electrical contact. In order to give maximum area of contact, the brushes 238 and 238' are preferably spaced as close together as possible, and to make the contact direct they are engaged directly against the back of the electrodes.

Figures 22, 23:
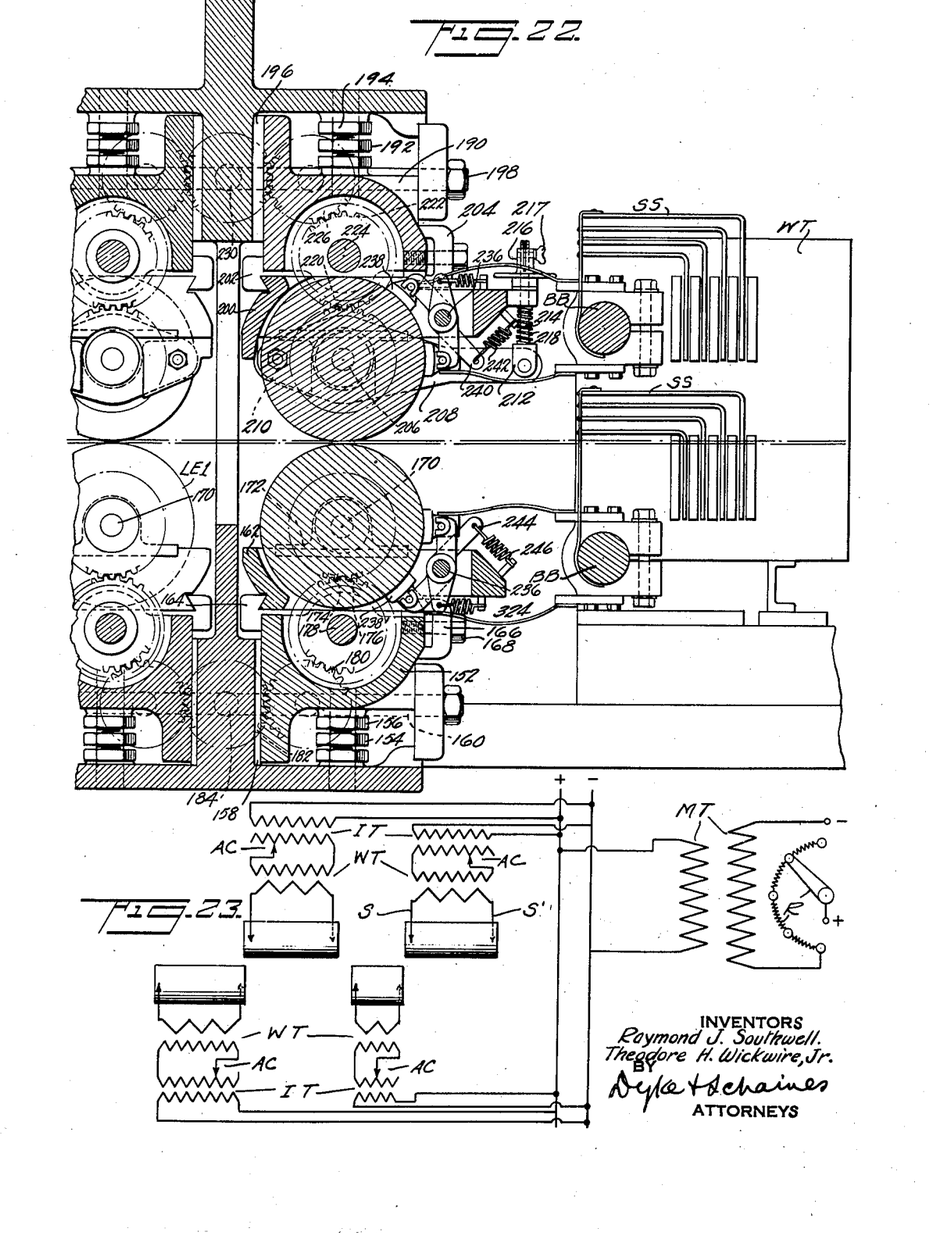
Fig. 22 is a section on line 22—22, Figure 21.
Fig. 23 is a welding circuit diagram.
Figure 24:
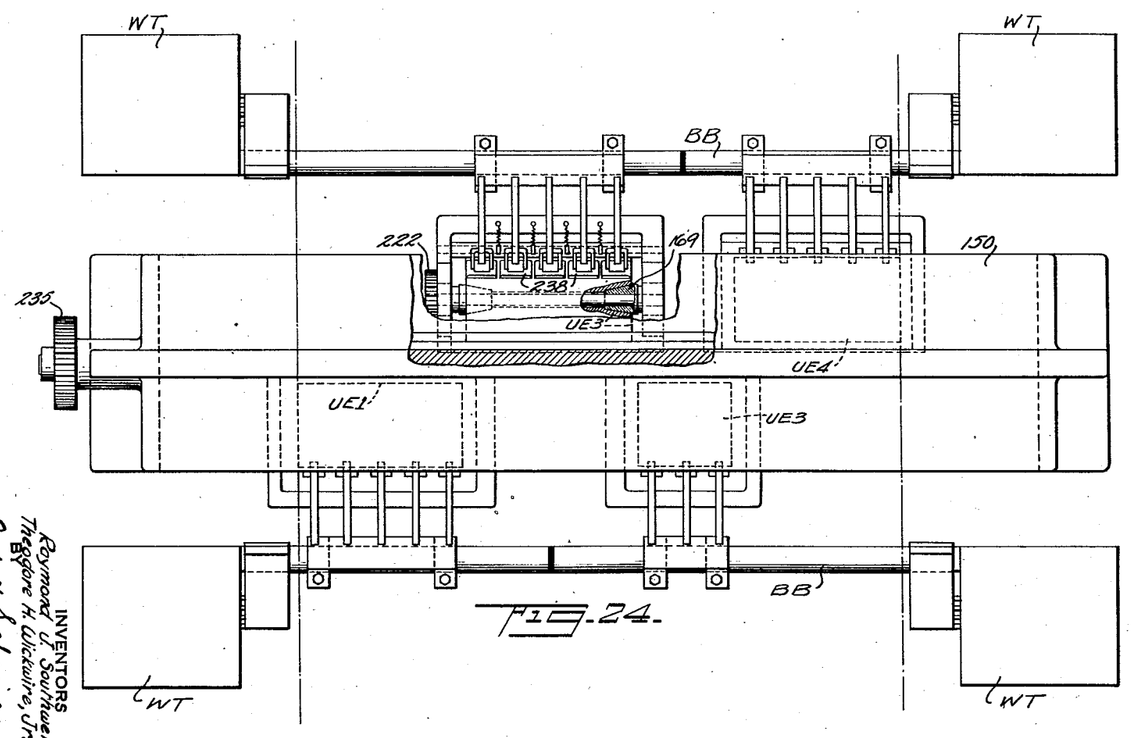
Fig. 24 is an enlarged plan view with parts broken away, of the welding station.

The welding transformers WT, one for each pair of roller electrodes, are preferably arranged at each side of the travelers 14 and substantially opposite the two rows of roller electrodes as shown in Figure 24. With such arrangement, the bus bars BB can be relatively short and undue inductive effects therefrom avoided. Their number is also kept down to a minimum by welding numerous crossings in gaps between single rollers of material length. The welding transformer WT for each pair of welding rollers LE, UE, has the secondary leads S, S' thereof connected to the brushes of the upper and lower rollers of the pair respectively. Such connection is indicated in the wiring diagram on Figure 23 in full lines and dotted lines respectively.

Current regulation applying generally to all the pairs of roller electrodes may be obtained by means of the rheostat R in the primary side of the main transformer MT. It is also desirable to be able to regulate the current for each pair of rollers individually, particularly where the rollers are not all of the same length, and this is preferably done by interposing an intermediate or regulating transformer IT between the main transformer MT and the welding transformer WT, with an adjustable coil as indicated at AC preferably in the secondary side of such intermediate transformer IT, the arrangement being the same for each of the pairs of welding roller electrodes.

The two sets of pairs of roller electrodes are so arranged with respect to the travelers and hook spacings used that the narrow regions or belts in which welding is done by the electrodes of the two sets are separated by a distance equal to a number of the longitudinal diagonals of the mesh (the same length as the spacing of hooks 20) plus a quarter of such diagonal. (2¼ diagonals in Fig. 25.) In this way, the passage of the welding current through presented wire crossings does not occur simultaneously in both of the two welding belts or regions across the diamond mesh fabric, but is always confined to one or the other thereof, with the result that the peak current load is kept down. The preferred order of welding is as indicated in Figure 25, namely at crossings 1, 1, 1, next at 2, 2, 2, then at 3, 3, 3, and finally at the crossings indicated by the numerals 4, 4, 4, and the cycle then returning to 1, 1, 1, and so on indefinitely.

As the machine is operated, the mesh is continuously formed by the cross carriage engaging the strands with the traveler hooks and the mesh so formed is continuously advanced while held in such formation, and with the meshes trued up by engagement with the grooved truing up roller, such mesh of crossed wires so held is passed between the welding rollers and makes contact and completes the welding circuit therebetween at the points of wire crossing.

If it is desired to elongate the welding interval, this is accomplished by reducing the speed of the whole machine driven by a single motor, or the welding interval can be reduced by increase of the machine speed which can be closely regulated by the speed controlling mechanism that is provided. As an example, at a travel of 40' per minute, which is 8" per second, (and which speed, though enormously greater than possible with any operation involving weaving or twisting operations, is well within the range of speeds that are easily reached with our apparatus) if ¼" be assumed as the length of travel during welding contact, the welding interval will be $\tfrac{1}{32}$ of a second, which in the case of 60 cycle alternating current will cover 3 and a fraction of the 120 alternations per second. The current supply is regulated generally for all the electrodes, and individually for each pair.

In general, in welding diamond mesh and as will be plain from Figure 25, the number of crossed wires to be welded will vary at successive contact periods. As for example, it may be first 10 and then 9 and then 10 again, and so on. (Figure 25 shows 5 and 4 respectively.) This of course means that there will be about a 10% increased amperage effective at each welding point, where 9 welds are made, for example, at one contact period, as compared with 10 welds made in the same roller gap at the next after or preceding contact period. This percentage variation is least for long rollers and numerous welds and increases for shorter rollers with fewer welds, as for example, if the welding contacts of a short roller are 3—4—3—4 instead of 9—10—9—10, then the increased amperage at each 3-weld period over that at each 4-weld period would be considerably more than 10%, namely about 33⅓%, and it can be readily seen that a time interval for welding that would be right for the 4 welds per roller electrode pair, would not be equally well adapted for making 3 welds in the same roller-pair gap. Preferably the electrode lengths should be so selected along with the wire spacing used that the least and highest number of welds per roller pair at successive contact periods will not differ by more than about 20%. When the electrodes are of copper, its high heat conductivity appears to be of advantage in taking up excess heat and tending to equalize the heating effects due to small variations in current flow. The selvage is preferably welded separately by being passed between pairs of selvage welding rollers 250, 250' between the point of release of the fabric from the traveler and the take-up roll (not shown), and arranged and operating for making welds in substantially the same manner as already described with respect to electrodes UE and LE. To enable the welding rollers to be dressed or trued up as may occasionally be desirable and still be run at traveler speed the drive thereof from shaft 76 may include a variable gear reduction device as indicated at 252, Fig. 1.

Extra wires may be welded on at the selvage if desired, or longitudinal wires may be welded over the mesh, and various other formations obtained by means of welding rollers similar to those indicated at 250, 250', and various other changes resorted to within our invention.

We claim:

1. In apparatus for making unwoven wire mesh fabric, means for supplying continuous strands of wire from stationary sources of supply and forming them into unwoven mesh relation, means for traveling the mesh along while holding same in the formed relation, means for continuously welding the strands directly to one another at crossings while so held and traveled, and means for releasing the completed mesh fabric from the traveling means.

2. In apparatus for making unwoven wire mesh, stationary sources for supplying a set of continuous wires, means for continuously forming the wires as they come from the supply source into fabric formation consisting of crossed, unwoven wires, means for holding same and traveling same forward, and substantially continuously operating means for electrically welding the wires to one another at crossings as so held and traveled.

3. Apparatus as in the preceding claim, in which the stationary sources of wire supply are reels so arranged that the wires come off the reels in the direction that the formed mesh thereof is traveled, and bending of the wires in course of formation is thereby minimized.

4. Apparatus for making unwoven wire mesh fabric comprising stationary wire strand supplying sources, travelers provided with spaced strand engaging means, means for taking the strands from such supply sources and engaging same alternately with the strand engaging means of the respective travelers, so that the same are held and traveled in crossing relation, and means for bonding the strands directly to one another at strand crossings as they are so held and traveled.

5. Apparatus for making welded unwoven mesh fabric, comprising means for forming a sheet from a set of continuous strands in crossing relation, so that the outside strands of the set are respectively beneath and on top and the others partly above and partly below in graduated relation therebetween, means for holding the strands in such relation and traveling them along, and means for welding them to one another at crossing points as they are so held and traveled.

6. In apparatus for making welded, unwoven wire mesh fabric, stationary means for supplying continuous strands of wire, traveling strand-engaging means, means for taking strands from the stationary supplying means and engaging them with the engaging means as the latter travel along to produce an unwoven mesh having strand crossings, and means for welding the strands to one another at crossings as they travel along.

7. In apparatus for making welded unwoven mesh fabric of continuous wire strands, means for producing lateral recurrent transitory movement of a set of multiple parallel strands, and means traveling at substantially right angles to such transitory movement direction for engaging the strands and traveling the formed mesh of strands, and means for welding the strands to one another at crossings while so held and traveling.

8. Apparatus for making unwoven wire mesh fabric, comprising means for forming layers of parallel continuous strands of wire into crossing relation, means for holding them in such relation and traveling them along with a continuous uninterrupted movement, and means for welding them to one another locally at their crossings as they are so held and traveling along.

9. In wire mesh making apparatus, a pair of endless conveyors having spaced loop engaging means, means for looping a multiple set of wires of width at least as great as the distance between the conveyors back and forth about successive sets of engaging means as same are advanced by the conveyors, and means for welding the wires to one another at their crossings while traveling with the conveyors.

10. In apparatus for making open mesh wire fabric, two sets of parallel movable hook means, means for taking the pull of said sets of hook means toward one another, separate means for traveling the hook means in an endless path, means for alternately engaging a set of parallel wires with hooks of each set, and means for automatically welding the traveling wires to one another when said welding means is encountered by a double thickness of wire.

11. In apparatus for making open mesh wire fabric, a pair of spaced-apart traveling members provided with hooks, means reciprocating thereacross for passing a set of wires from the neighborhood of one to the other, and means on the reciprocating means to pass each of the wires about two successive hooks as they travel along, whereby a selvage is formed along the fabric edge.

12. Apparatus as in claim 11, together with means for welding the wires in the body of the mesh to one another at wire crossings while held and traveling with the traveling members, and separate welding means for welding the selvage after the mesh is released.

13. In apparatus for making open mesh wire fabric, conveying means, reciprocating means for passing a set of parallel wires across and back with relation to said conveying means, and means for effecting a lowering and then an elevation of the reciprocating means and thereby of all of the wires of the set at points of reversal and thereby effecting engagement of the wires with the conveying means.

14. Apparatus for making open mesh wire fabric comprising a pair of parallel conveyors provided with spaced wire engaging means, means for taking lateral strain off the conveyors means reciprocating across between the conveyors for engaging a plurality of wires alternately with a set of the engaging means on one conveyor, and then with a set thereof on the other conveyor, and repeat, and means comprising roller electrodes between which the wires so laid are passed for welding the wires together at their crossings.

15. Apparatus for making a continuous strip of open mesh square-diamond pattern wire fabric which comprises a pair of traveling conveyors, spaced wire engaging members facing one another on said conveyors, means for alternately looping about the wire-engaging means, on the said two conveyors respectively, a set of parallel wires the total width of which set is substantially twice the width between the conveyors, welding means between which the wires so held and traveled are passed for welding the wires together at their crossings, and means in the course of travel of the conveyors beyond the welding means for producing a lessened distance between the wire engaging means to permit release of the completed fabric.

16. Apparatus for making a continuous strip of open mesh wire fabric of square-diamond pattern, comprising a pair of parallel conveyor chains, wire engaging members slidably associated with each link of the chain, track members engaged by said slidable members for guiding same in their movement with the conveyor chain so as to take the lateral pull off the conveyor chains and also to adjustably control the distance between the sets of wire engaging members including securing at the discharge end a distance that is minimum for permitting the release of the completed fabric, means for alternately engaging a set of parallel wires, the width of which set is substantially twice the distance between the conveyor chains, with the wire engaging members on said two chains respectively, and means for continuously welding the wires so held together at their crossings as same are conveyed along.

17. Apparatus for making a continuous strip of open mesh welded wire fabric comprising a pair of parallel conveyors, wire-engaging means traveling with the conveyors and movable transversely to the direction of conveyor travel, means for engaging a set of parallel wires alternately with the sets of wire-engaging means of the two conveyors respectively as they travel forward, and pairs of substantially smooth cylindrical welding rollers between which the wires so held travel on the conveyors, and comprising lower rollers over which the wires so held pass, and upper rollers co-acting with the lower rollers, and means for passing an electrical current through said rollers in pairs whereby the circuit is closed by crossing wires and same are welded together in parallel at the numerous places of crossing as they travel along, and means producing relative approach of the wire engaging means for releasing and discharging the welded fabric.

18. Apparatus for rapid and continuous manufacture of unwoven open mesh welded wire fabric which comprises a pair of continuously moving endless travelers arranged parallel and spaced apart and capable of operating at substantially any speed within a wide range, spaced wire engaging means carried by said travelers, means to sweep back and forth thereover and engage a broad set of parallel wires alternately with the wire engaging means of the respective travelers as they move along, and one or more pair of roller electrodes located respectively above and below the traveling formation of crossed wires, said electrodes being biased toward one another and being spaced apart a minimum distance which is greater than the thickness of one wire and being adapted to be spread further apart by passage of the crossed wires therebetween, and means for applying a welding circuit to said electrodes open only at the gap between the electrodes so that the circuit is closed by the crossing wires and same automatically welded to one another as they pass between the roller electrodes, and means for regulating the speed at which the travelers and wire sweeping and engaging means are run to thereby control the length of welding interval as desired.

19. In apparatus for making welded mesh of crossing wires, means for forming, holding and traveling a mesh of crossed wires operable practically without limitation as to speed, means operable within a relatively limited range of speed for welding the crossed wires to one another at crossings as the mesh travels, and means for controlling the speed of the first-named means for the purpose of securing a proper interval for operation of the welding step.

20. Apparatus as in the preceding claim in which the welding means comprise roller electrodes rotating at traveler speed.

21. Apparatus for making welded unwoven wire mesh comprising a pair of endless conveyors, hooked wire engaging members traveling with said conveyors and movable in a direction that is lateral relative to the conveyor travel, means alongside the path of conveyor movement for taking the pull on the laterally movable members, means for engaging alternately with hooks associated with either conveyor as they travel along a set of parallel wires the width of which set is at least as great as the distance between the conveyors, and means for welding the wires to one another at crossings as same are held and traveled along.

RAYMOND J. SOUTHWELL.
THEODORE H. WICKWIRE, Jr.